(12) United States Patent
Schumacher

(10) Patent No.: US 6,321,786 B2
(45) Date of Patent: Nov. 27, 2001

(54) CARTRIDGE FOR A SINGLE-LEVER MIXING FAUCET

(75) Inventor: Peter Schumacher, Ahlen (DE)

(73) Assignee: KLUDI Aramaturen Scheffer Vertriebs- und Verwaltungs OHG, Menden (DE)

( * ) Notice: Subject to any disclaimer, the term of this patent is extended or adjusted under 35 U.S.C. 154(b) by 0 days.

(21) Appl. No.: 09/768,923

(22) Filed: Jan. 24, 2001

(51) Int. Cl.[7] ............................. F16K 51/00; F16K 11/00
(52) U.S. Cl. ........................................ 137/613; 137/625.17
(58) Field of Search ........................... 137/625.17, 613

(56) References Cited

U.S. PATENT DOCUMENTS 4,960,154 * 10/1990 Dagiantis ................. 137/625.17
5,224,509    7/1993 Tanaka et al. .
5,494,077 *  2/1996 Enoki et al. .............. 137/625.17
5,755,262 *  5/1998 Pilolla ..................... 137/625.17

FOREIGN PATENT DOCUMENTS 196 23 104   12/1997 (DE) .
198 46 720    4/2000 (DE) .
0 392 441    10/1990 (EP) .

* cited by examiner

*Primary Examiner*—Kevin Lee
(74) *Attorney, Agent, or Firm*—Herbert Dubno

(57) ABSTRACT

A cartridge for a mixing faucet is provided, in addition to the valve formed by a pair of disks and controlled by a single lever, with an electrically operated valve which can be actuated by a proximity detector to respond to the presence of a user's hand near the valve outlet.

4 Claims, 3 Drawing Sheets

CARTRIDGE FOR A SINGLE-LEVER MIXING FAUCET

FIELD OF THE INVENTION

My present invention relates to a cartridge for a single-lever mixing faucet of the type in which the control of the flow and of the water temperature is effected by the movement of one disk relative to another by a lever pivotal in a cartridge housing in which the disks are contained.

BACKGROUND OF THE INVENTION

Cartridge-type water faucets which have a faucet body capable of receiving the cartridge and whereby the hot and cold water lines are connected to the outlet through the cartridge are increasing in utilization throughout the world.

It is also known to provide contactless electrically-controlled faucets which have been widely used in public facilities. However, if the electric current supply to such faucets fails or electrical components like electric valves fail, water cannot flow from the faucet.

OBJECT OF THE INVENTION

It is, therefore, the principal object of the present invention to provide an improved cartridge for a single-lever mixing faucet of the aforedescribed type which enables water supply even in the case of a failure of the electrical component or of the supply power.

Another object of this invention is to provide a more versatile cartridge for a faucet whereby drawbacks of earlier systems are avoided.

SUMMARY OF THE INVENTION

These objects are attained, in accordance with the invention by providing within the cartridge a second valve, i.e. a valve in addition to that formed by the relatively slidable disk and in an outlet passage of this cartridge or the first valve thereof. More particularly, the cartridge for a single-lever mixing faucet according to the invention can comprise:
- a faucet-cartridge housing;
- a nonshiftable inlet/outlet disk in the housing communicating with hot and cold water inlets and an outlet;
- a shiftable control disk in the housing juxtaposed with the inlet/outlet disk for selectively connecting the inlets with the outlet;
- a lever pivotally mounted in the housing and operatively connected with the control disk for displacing the control disk; and
- an electrically operated valve within the housing in the outlet.

With the control afforded by the present invention, the electromagnetically operated valve can be triggered to enable and disable the flow of any response to the project to the faucet, e.g. the hand of the user, while manual actuation is also possible. The manual actuation can enable control of the volumetric flow rate so that the flow itself can be independent of the electric valve. The manual operation allows supply of the water even in the case of a failure of the proximity switch or other means for sensing the presence of the user.

The manual actuation, in addition, allows complete blockage of the flow so that for cleaning of the faucet or the basin or sink, undesired openings of the electrical valve by the proximity or contactless sensor will have no effect.

It is especially advantageous to form the inlet/outlet disk with a second outlet opening form which water passes through the system, the second passage opening directly into the outlet. The second valve should be advantageously an electromagnetic membrane valve.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
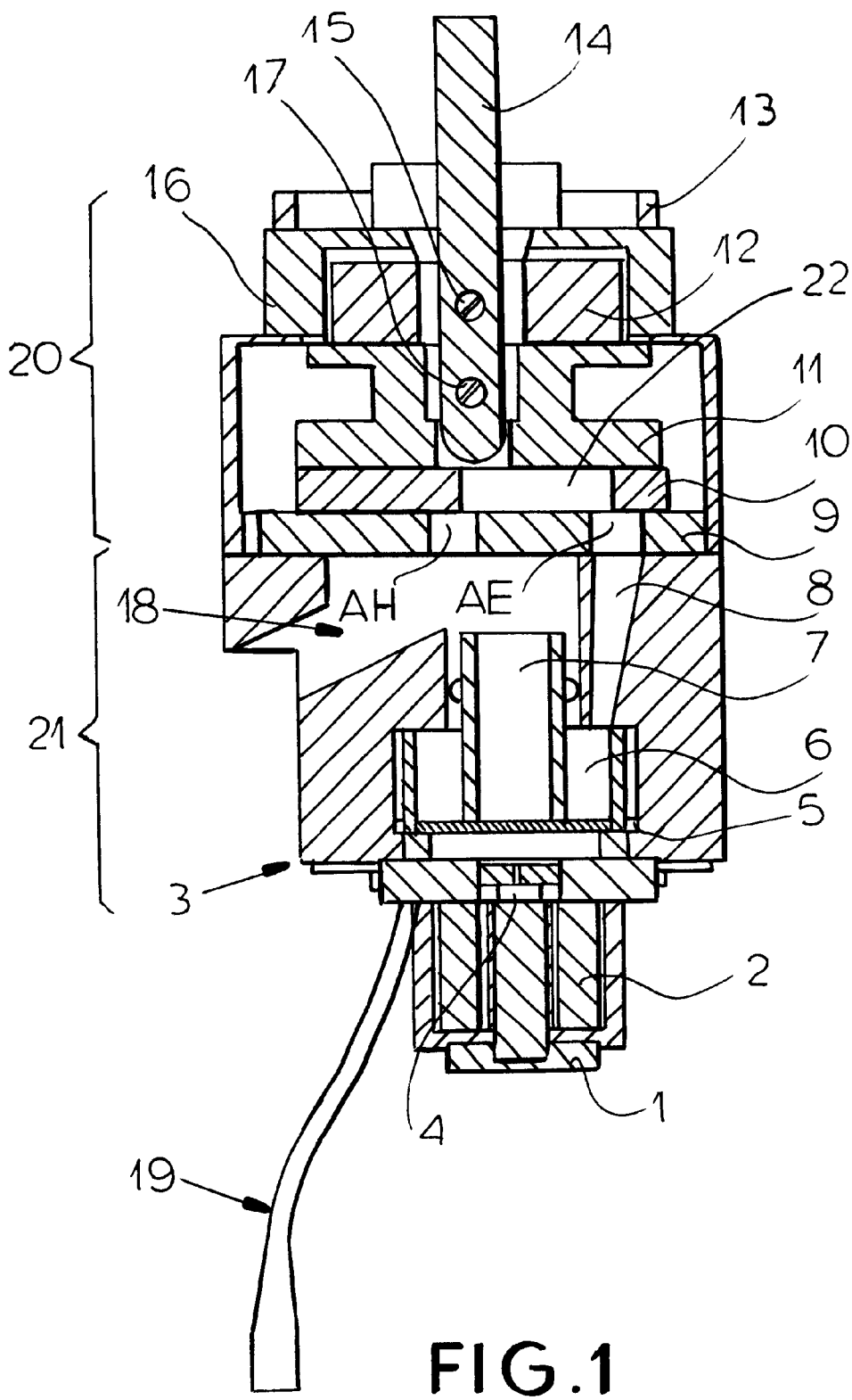
FIG. 1 is an axial section through a cartridge provided with an electromagnetic valve according to the invention.
Figure 2:
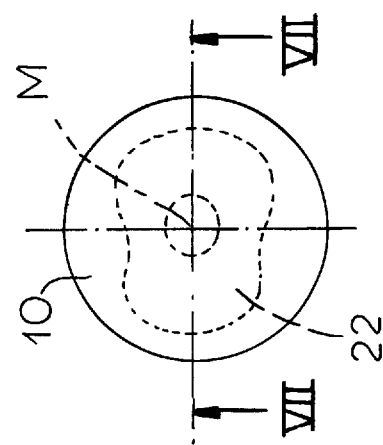
FIG. 2 is a plan view of the lower housing region of the cartridge.
Figure 3:
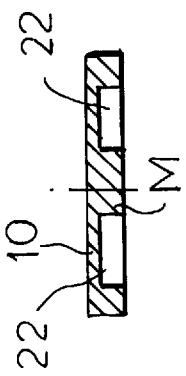
FIG. 3 is an axial section through the lower housing region.
Figure 4:
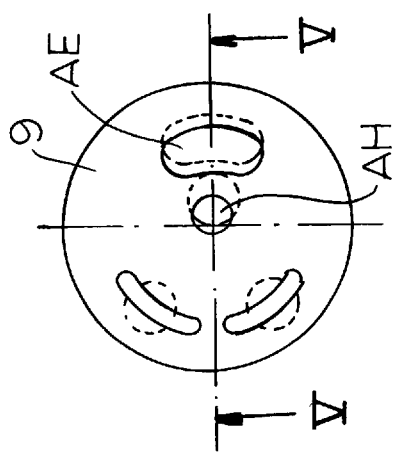
FIG. 4 is a plan view of the nonmovable inlet/outlet disk.
Figure 5:
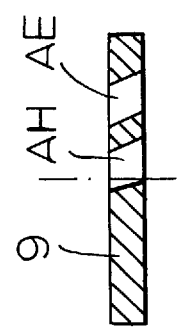
FIG. 5 is a section taken along the line V—V of FIG. 4.
Figure 6:
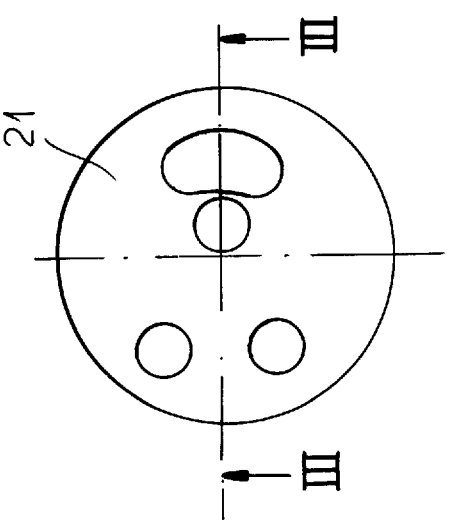
FIG. 6 is a plan view of the movable disk.
Figure 7:
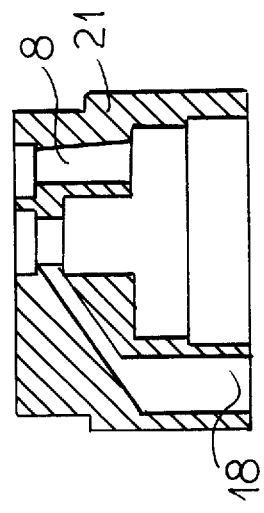
FIG. 7 is a section taken along the line VII—VII of FIG. 6.
Figure 9:
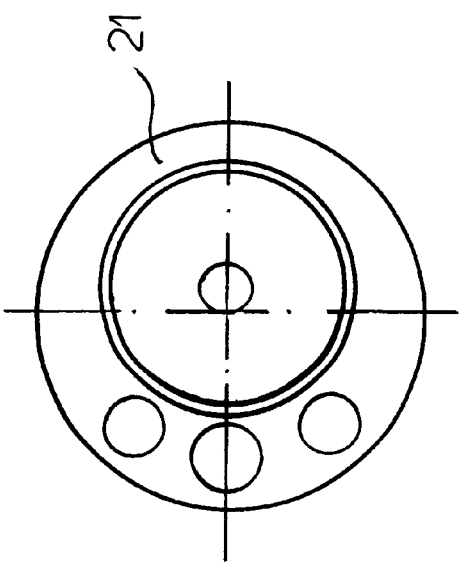
FIG. 9 is a bottom view of the lower housing region as represented in FIG. 3.
Figure 8:
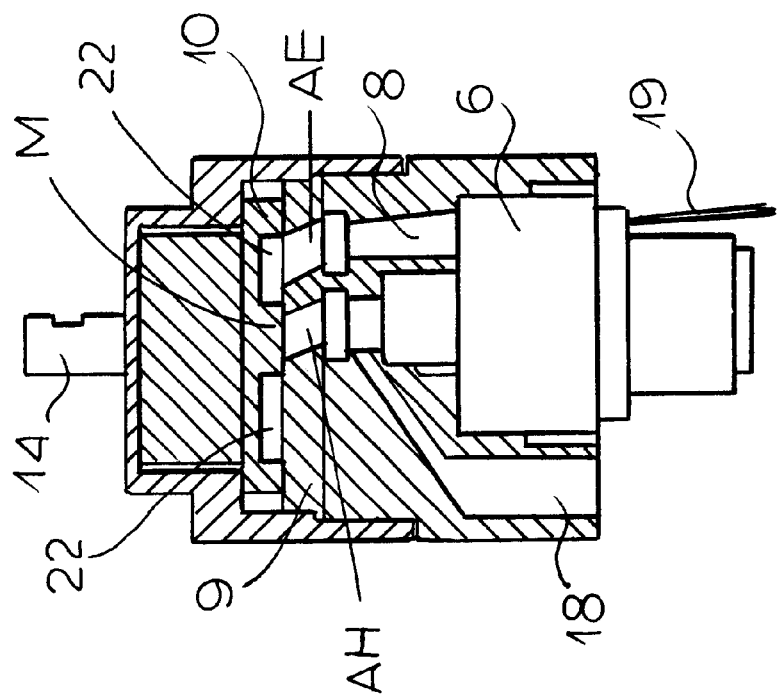
FIG. 8 is an axial section through the cartridge.

The cartridge shown in the drawing for the single-handle mixing faucet is received in a housing of the faucet which has not been shown and which is provided with a hot and cold water fitting and a spout or other outlet connected to the outlet of the cartridge. The cartridge can be replaced as a unit and eliminates the need to change washers, thereby renewing the interior of the faucet as a unit.

The cartridge itself comprises an upper housing portion 20 and a lower housing portion 21. In the underside of the upper housing portion, an inlet/outlet disk is fixedly mounted and has an inlet opening EW for the hot water, an inlet opening EK for the cold water, an outlet opening AH for the mixed water and under manual control and a mixed water outlet opening AE under electrical control.

Above the inlet/outlet disk 9 is a horizontally movable control disk 10 with a downwardly open mixing chamber 22 which, depending upon the position of the disk 10 connects the opening of the inlet/outlet disk 9 with one another so that cold water and/or warm water and usually a mixture of the two can flow at greater or lesser flow rates to the outlet opening AH or the outlet opening AE as selected by the lever 14 which is pivotally mounted in the cartridge and engages the control disk 10. The manual lever 14 has the following positions:

1. The lever down: no water discharged possible (sleep function). For cleaning of the faucet or of the basin or sink.

2. Lever 14 in an intermediate position (automatic mode). Flow and temperature determined by the position of the lever. On and off determined by the electrically-operated valve.

3. Lever 14 up: water flows continuously. Used, for example, in the case of a failure of the supply current to the electric valve or a failure of the electric valve itself.

The electrically-controlled membrane valve 6 is located in a lower housing portion of the cartridge and has a membrane movable from a closed position into an open position by an electromagnet coil 2. When the valve 6 is electrically energized, it opens and the mixed water flows from the outlet opening AE via the outlet passage 8 to the valve outlet 7 into the cartridge outlet 18. The opening AH can be closed by a middle region M of the control disk 10.

If the valve 6 is not energized and thus closed, the outlet opening AH can be opened by movement of the disk 10 and the mixed water can bypass the valve 6 to the outlet 18. The flow is controlled then exclusively by the position of the lever 14 and the electrical valve is not effective. With the application of an electrical pulse to the coil 2, the control piston 4 is so positioned that flow is permitted from the inlet to the valve 6 through the membrane 5 and out through the outlet 7 of the valve 6 from the control unit. By means of the disk 1, which is preferably a magnet, the position of the control piston 4 can be set independently of the electrical signal. When the electrical signal is applied, therefore, the position of the piston 4 can be altered so that flow through the outlet 7 is permitted or prevented.

The geometry of the disks 9 and 10 are so selected that the requisite degree of mixing of the fluid and flow through the cartridge as a function of the relative position of the disk is permitted. Similarly the geometry of the disks 9 and 10 also determine the position of the toggle lever 14 at which flow will be blocked at the outlet 18 or permitted.

A bushing 11 is braced against the disk 10 and entrains the latter, the bushing 11 being pivotally connected at 17 to the lever 14 which, in turn, is pivotally connected at 15 to a ring 12 fixed in the upper housing portion 20 and surrounded by a cap 16 surmounted by a ring 19.

The electrical valve 6 can be connected to a proximity detector responsive to the introduction of the hands of the user into the region of the faucet, e.g. below the spout.

I claim:

1. A cartridge for a single-lever mixing faucet comprising:

a faucet-cartridge housing;

a nonshiftable inlet/outlet disk in said housing communicating with hot and cold water inlets and an outlet;

a shiftable control disk in said housing juxtaposed with said inlet/outlet disk for selectively connecting said inlets with said outlet;

a lever pivotally mounted in said housing and operatively connected with said control disk for displacing said control disk; and an electrically operated valve within said housing in said outlet.

2. The cartridge defined in claim 1 wherein said inlet/outlet disk is formed with a first discharge opening communicating with said outlet through said valve and a second discharge opening communicating directly with said outlet.

3. The cartridge defined in claim 2 wherein said electrically operated valve is an electromagnetic membrane valve.

4. The cartridge defined in claim 1 wherein said electrically operated valve is an electromagnetic membrane valve.

* * * * *